Nov. 9, 1965   W. C. BURGESS, JR   3,216,556
VIBRATORY CONVEYOR
Filed June 8, 1964   3 Sheets-Sheet 1
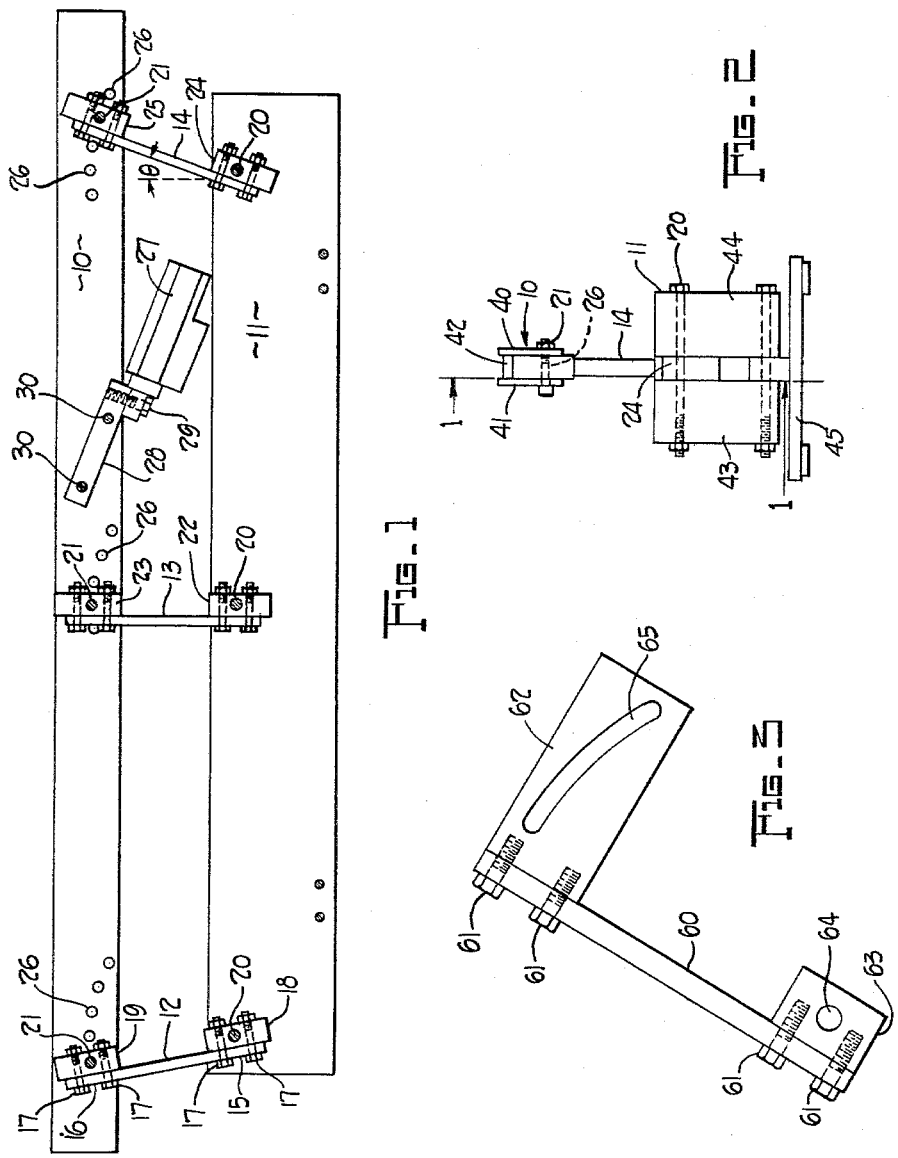
INVENTOR.
WARREN C. BURGESS JR.
BY
Schramm, Kramer & Sturges
ATTORNEYS.

Nov. 9, 1965    W. C. BURGESS, JR    3,216,556
VIBRATORY CONVEYOR

Filed June 8, 1964    3 Sheets-Sheet 2

*INVENTOR.*
WARREN C. BURGESS JR.
*BY*
Schramm, Kramer & Sturges
ATTORNEYS.

United States Patent Office 3,216,556
Patented Nov. 9, 1965

3,216,556
VIBRATORY CONVEYOR
Warren C. Burgess, Jr., 27018 Kennedy Ridge Road,
North Olmsted, Ohio
Filed June 8, 1964, Ser. No. 373,583
6 Claims. (Cl. 198—220)

This invention relates to an apparatus for conveying materials or articles over a horizontal or inclined path by vibratory means, and more particularly to vibratory conveyor apparatus characterized by a plurality of springs which coact between a conveyor receptacle member and a weight mass.

This application is a continuation-in-part of my application Ser. No. 95,131 filed Mar. 13, 1961, now abandoned.

As most commonly constructed, vibratory conveyors, feeders, or screens, comprise a receptacle, a base, a spring system supporting the receptacle from the base and defining the path of reciprocation or vibration, and means for oscillating or vibrating the receptacle along the confined path. The usual spring system comprises a plurality of flat, usually rectangular flat leaf type springs disposed at a uniform angle to the base. It has been found that unless the base is possessed of infinite mass, vibrations are induced in the base as well as in the conveyor receptacle. These vibrations in the base are transmitted through the mechanized linkage of the spring back to the conveyor receptacle and have the effect of superimposing motion resulting from movement of the base upon the motion imparted to the receptacle by the driving means, or vibration inducing device. These forces, which at some points may be additive in their effect and at others subtractive in their effect, cause variations in the character of the impulses imparted to the material being conveyed. The result of these variations manifests itself in loss in efficiency in conveying, undue bouncing of articles, loss of speed of transfer from one point to another, and loss of uniformity of speed of transfer. Where, for example, parts are being transferred from a source to a point of use, uniformity of speed of delivery is oftentimes essential.

A very simple means has been found which enables the control of the superimposed forces occasioned by the fact that the mass of the base is finite rather than infinite in such a manner that increased speed, better efficiency and smoother operation may be secured with devices in accordance with the present invention.

The principles of the present invention are applicable to numerous conveying devices for conveying a wide variety of materials and articles from one point to another or for vibratory separation or assembly of parts, materials, and vibratory classification means. The nature of the vibratory receptacle is of little importance as long as it has some mass. Therefore, this invention will be described with reference to a transfer parts feeder which is an apparatus especially adapted to receive parts in oriented position from a source such as a vibratory bowl type parts feeder for transfer from such device to a point of utilization by other machinery e.g. for assembly purposes.

In the annexed drawings:

FIG. 1 is a side elevational view of a transfer feeder assembly in accordance herewith.

FIG. 2 is an end view of the transfer feeder shown in FIG. 1.

FIG. 3 shows another means for providing for adjustment of spring angle.

Figure 4:
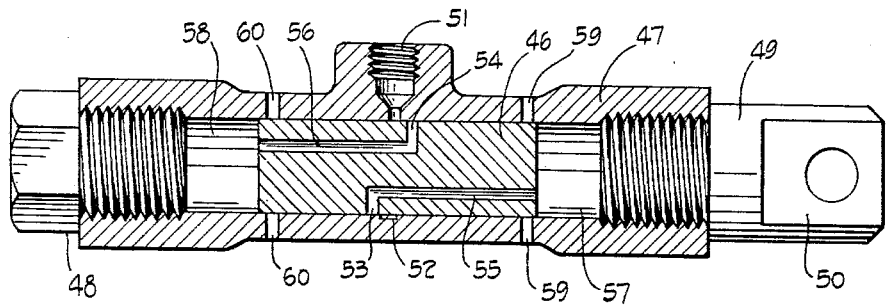
FIG. 4 is a cross-sectional view of a pneumatic vibration inducing device useful in driving the vibratory conveyor.

Briefly stated, this invention is an improvement in a vibratory conveyor having a base, an elongated conveyor receptacle disposed parallel to the base, an inlet extremity and an exit extremity, a plurality of spring stations disposed at spaced intervals from each other, each of which stations includes an elongated flat leaf spring secured at its extremities to the base and the receptacle for resiliently supporting and guiding the receptacle along a confined curved path which lies in a single plan. Also included are means for oscillating the receptacle along this path. In accordance herewith, there is provided a plurality of spring stations. There may be two or more such spring stations, most usually two or three spring stations, disposed at spaced intervals along the track. The springs in one station are set at an angle which differs from the angle of the next adjacent spring station. The controlling spring angle differential is between the first and second spring stations, and ranges from 2° to 15°. Springs in a given spring station are set at a positive or negative angle with respect to the vertical such that $\alpha \neq \beta \neq \gamma$ . . . .

In a specific embodiment utilizing a pair of spring stations, the first of these spring stations, including spring means is disposed adjacent the inlet extremity and has a spring angle with respect to the vertical between +12° and +20°. The next succeeding spring station included spring means disposed at an angle with respect to the vertical between 0° and +10°. The initial pair of spring stations encountered by articles or material being transferred by the devices hereof are important. Subsequent spring stations may be encountered, and they too include springs disposed at angles to the vertical determined by the vibrational characteristics as will be hereinafter more particularly described. The springs in each station may be adapted to variation of the angle with respect to the vertical, or the springs may be at fixed, predetermined angles within the ranges of angular displacement for each station. The term "vertical" as used herein means normal to the conveyor receptacle or trackway.

Referring now more particularly to FIGS. 1 and 2, there is here shown a transfer feeder having a conveyor receptacle generally indicated at 10 and a base generally indicated at 11. Coacting between receptacle 10 and the base 11 is a plurality of leaf springs 12, 13 and 14 which are adapted to guide and support the receptacle 10. The ends 15 and 16 of spring 12, are fixedly attached as by bolts 17 through blocks 18 and 19, respectively, which are in turn fixedly bolted as by bolts 20 and 21 to the base and the receptacle 10. Each of springs 13 and 14 is likewise adapted at each end to be bolted to blocks 22 and 23, and blocks 24 and 25, respectively.

Receptacle 10, or if desired, base 11, is provided with a plurality of holes 26 which are adapted to receive bolts 21 through blocks 19, 23 and 25, respectively. Thus, the angle described by the spring surface with respect to the normal may be varied for each spring independently of the others and in accordance with principles hereinafter more particularly described.

Instead of the radially disposed bolt receiving holes 26 such as shown in FIG. 1, any other suitable means permitting adjustment of the angle θ of the springs individually and providing for securely clamping the springs to the conveyor receptacle 10 may be used. Thus, the track sides 40 and 41 may be used as clamping surfaces with suitable bolts therebetween to exert a retaining force on the blocks 19, 23 and 25. Likewise, instead of holes 26, arcuate slots may be provided such slots having a width sufficient to receive the bolts 21, and struck on a radius using the axis of the bolts 20 as the center, as is the case with the disposition of the holes 26.

Spring stations including springs 12, 13 and 14, may denote individual springs fastened to the receptacle 10 and base 11, or pairs of similarly disposed springs fastened to opposite sides of receptacle 10 and base 11, depending on the track width of receptacle 10 in relation to its conveying surface.

One embodiment of the invention is of such length as to necessitate the use of three springs 12, 13 and 14, e.g. 36″ although the number of springs or spring stations increases with the length of the receptacle 10, it should be understood that the basic concept of this invention is in the angular dispositions of a first spring 14 adjacent the inlet extremity of the receptacle 10, and a second succeeding spring 13. In all forms which this invention takes, i.e. having 2 spring stations, 3 spring stations, or more spring stations, the first two spring stations encountered have flat leaf type springs disposed at angles relative to the vertical within the ranges above stated. Where the tracks or receptacles are shorter and/or more rigid, e.g. generally between about 10″ and 24″, in length, the angles of disposition of the springs in stations A and B, respectively (from the inlet), are +12° to +20°, and 0° to +10° from the vertical. With three stations, and a longer and/or less rigid track, e.g. 20″ to 40″ long, the angles of disposition of the springs in stations A, B, and C, respectively (from the inlet), are from 20.5° to 15°; 11.75° to 5.5°; 5° to —5° from the normal to the track or receptacle.

FIG. 3 shows an alternative means for providing for adjustment of spring angle. Here there is provided a leaf spring 60 having blocks 62 and 63 affixed as by bolts 61 to either end. Block 63 is provided with a hole 64 adapted to receive a bolt for holding the spring 60 in a base. Block 62 is provided with an arcuate slot 65, or its equivalent, the radius of which passes through the center of hole 64. Structures such as shown in FIG. 3 may be used to replace the spring and block assemblies of FIGS. 1 and 2, and all but one of the plural holes 26 for each spring position removed. Adjustment of the spring angle is then effected by merely loosening bolts 20 and 21 and manually adjusting the spring angle.

There is also provided in FIG. 1 a vibration inducing device 27 which is preferably of the pneumatic type shown in FIG. 3. Any single vibration inducing means may be used to drive the devices hereof, including mechanical, electromagnetic vibrators and rotating pneumatically driven ball in race vibrators. Any convenient means for attaching the vibration inducing device to the receptacle 10 such as vibrator mounting bracket 28 and bolt 29 may be used. The mounting bracket 28 is suitably bolted to the conveyor receptacle as by bolts 30. The angle of the vibrator axis to the horizontal, or the track surface is desirably from 0° to 30°, most usally about 20°. In general, the axis of the vibration inducing device is desirably parallel to the major axis of the path along which the track vibrates at the point where the vibration inducing means is attached.

FIG. 2 shows in greater detail the nature of the receptacle 10 which is a narrow track wide enough to properly retain the articles being transferred, having side walls 40 and 41 and track surface 42. Spring 14 is shown in place and bolt 21 passing through predetermined hole 26 sets the proper angle θ for spring 14. The base 11 is comprised of two massive weights 43 and 44 spaced apart and adapted to retain fixedly therebetween blocks 20, 22 (not shown) and 24. Bolt 20 secures the block 24, for example, between the weights 43 and 44. Footer 45 may conveniently be provided to support the entire assembly.

The pneumatic vibration inducing device 27 is shown in greater detail in FIG. 4. There is shown in FIG. 4 a free piston 46 reciprocably carried in a cylinder 47. One end of the cylinder 47 is capped with a suitable plug 48, and the opposite end of the cylinder 47 is sealed with any suitable means 49 adapted to attach the vibration inducing device to the object to be vibrated, e.g. the receptacle 10 in FIG. 1. In the form shown in FIG. 4, the means 49 is provided with an eyelet 50 through which may be passed suitable anchoring means 29 shown in FIG. 1. Mounted within the casing 47 is a cylindrical piston 46, the sides of which are in sliding contact with the machined inside surface of the casing of cylinder 47. The piston 46 is mounted for reciprocating movement in axial direction within the casing 47. The casing 47 is further provided with an inlet port 51 to permit the introduction of gas under pressure to the system. The inlet 51 communicates with a circularly grooved chamber 52 disposed between the piston 46 and the casing 47 whereby, gas under pressure is directed alternately to ports 53 and 54 in the piston 46 which in turn carry the gass under pressure through ducts 55 and 56, respectively, to end chambers 57 and 58, respectively of the casing 47. Thus, as the piston 46 is driven in a reciprocating manner, the gas under pressure will alternately be directed to end chambers 57 and 58. Following the introduction of the gas into end chamber 57, the spent gas is then released to the atmosphere through exhaust ports 59. Likewise, gas introduced to end chamber 58 through duct 56 is released to the atmosphere through the ports 60.

In the embodiment shown in FIG. 4 the piston 46 acts as a fast-acting cut-off valve. This is accomplished by the critical location and size of the interior ducts 55 and 56. Gas under pressure is introduced to the system through the inlet port 51 which leads to the circular chamber 48. When the piston 46 is slightly to the left of the position shown in FIG. 3, circular chamber 52 is in contact with the opening 54 of duct 56. Thus, gas under pressure flows through the duct 56 into end chamber 58 where such gas under pressure tends to force the piston 46 to the right. As the piston moves to the right, contact is established by the circular chamber 52 and opening 53 of duct 55, and the contact between the circular chamber 52 and the duct 56 is eliminated. Thus, gas under pressure commences flowing through duct 55 into end chamber 57, tending to decelerate the movement of piston 46 to the right. However the momentum of the movement of the piston 46 to the right carries the piston 46 beyond the point where full contact between circular chamber 52 and duct 55 is established. The gas present in end chamber 52 and duct 55 is established. The gas present in end chamber 57 is substantially sealed in that end chamber causing the pressure therein to build up greatly as the piston 46 continues to move to the right. Such increased pressure thus decelerates the movement of the piston to the right at an increased rate, and then accelerates the movement of the piston 46 to the left to complete the cycle.

Vibration-inducing devices of the type shown in FIG. 4 are of the quiet-action type because the compressed air which alternately builds up in the end chambers 57 and 58 serves as a cushion, and impacting of the piston with the end caps 48 and 49 does not occur. Ordinary piston-cylinder clearances may be used in the construction of these pneumatic vibrators. The pressure of gas, e.g. compressed air may vary from 5 to 150 pounds per square inch depending upon the frequency desired. There is no need to "tune" the spring characteristics of the springs 12, 13 and 14 to the frequency of the vibration inducing device, since the frequency of vibration of a pneumatic device may be easily controlled to the natural frequency of the system being vibrated by the mere expedient of regulating the pressure of the gas fed to the driving means. The point at which the apparatus is operating at the natural frequency is most often capable of being determined visually or audibly so that complicated apparatus and measurements need not be utilized to determine when natural frequency is secured.

Figure 6:
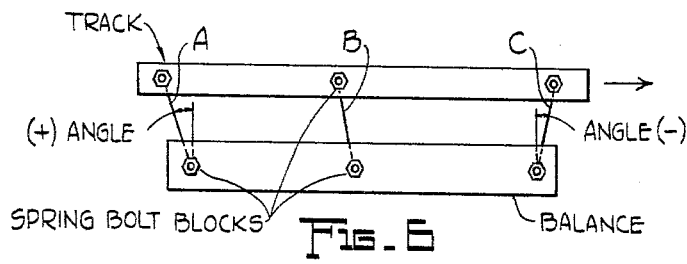
FIG. 6 is a diagrammatic representation of a transfer feeder of the present invention showing the relationship of the spring angles.
Figure 5:
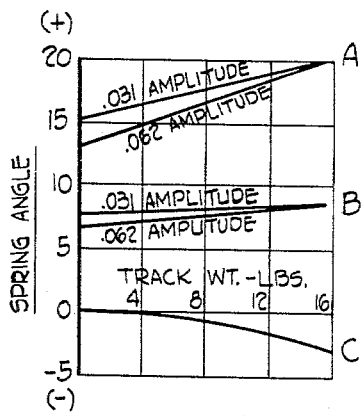
FIG. 5 is a graph showing variation of spring angle with track weight for an embodiment in accordance with FIG. 1.

FIG. 5 is a graph of a variation of the individual spring angles with respect to track weight in pounds, the track weight being the weight of the assembly 10, 19, 23, 25 and 27, i.e. the entire vibrating mass above the springs. FIG. 6 shows a diagrammatic representation of the apparatus shown in FIG. 1 bearing indicia referred to in FIG. 5. The direction of movement in FIG. 6 is from left to right. The graph of FIG. 5 indicates preferred variations in spring angle with track weight for optimum performance at amplitudes of .031 and .062 inch, respectively, and is a plot of actual data using a ¾" piston pneumatic vibrator. The angle of the vibrator to the track surface is 20°. The track in the device shown in FIG. 1 is conveniently 36 inches long and the base 31 inches long. The width of the track is about 1⅛ inch total, and the height of the track is about 2 inches. The centers of the bolts 20 holding the blocks 18, 22 and 24 are slightly less than 14 inches apart. The springs are 4" unsupported length, by .75" wide x .219" thick, spring steel. Air pressure is 60 p.s.i. on a .75" piston oscillating at 4900 c.p.m., a few c.p.m. below natural frequency. Optimum performance in a device having these dimensions causes both speed and stability, i.e. minimum bounce.

Figure 7:
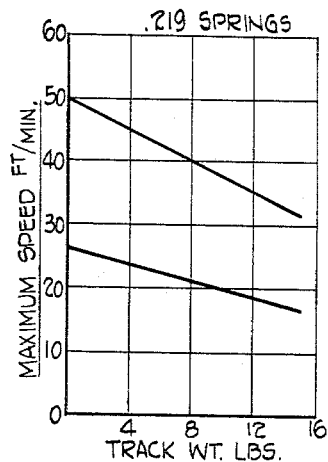
FIG. 7 is a graph showing the relationship of speed in feet per minute to track weight in pounds at two different amplitudes of vibration.

The six spring block bolts illustrated in FIG. 6 are loosened and the spring set to the angle corresponding to the track weight. The springs will have different settings. Spring-block assemblies such as shown in FIG. 3 are used. Occasionally angles forward of the vertical position are necessary to effect the superimposed forces of the high inertia base, e.g. base 11. The six bolts 20 and 21, respectively are then tightened fully. FIG. 7 is a speed chart showing the maximum speed at the same amplitudes referred to in FIG. 5 using steel parts. The speed will vary with part shape and material. Speed decreases with an increase in track weight because of a decrease in natural frequency, i.e. speed varies inversely with track weight and directly with the frequency. By "track weight" is meant the total weight supported by the springs, e.g. the weight of the track or receptacle, the mounting blocks, any tooling mounted on the track, etc.

Figure 8:
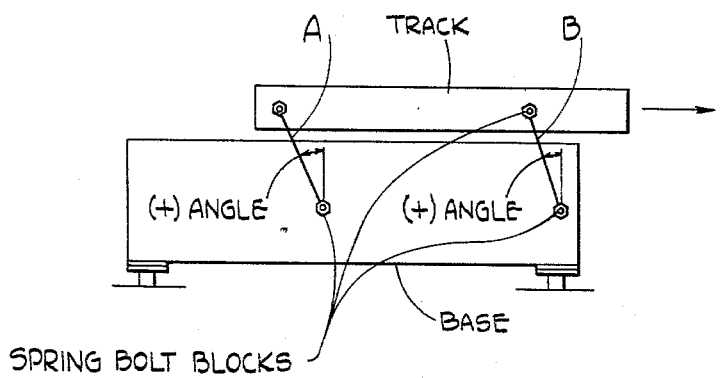
FIG. 8 is a diagrammatic representation of a transfer feeder of the present invention showing the relationship of the spring angles where two spring stations are employed instead of three.

FIG. 8 shows a diagrammatic representation of an apparatus similar to that shown in FIG. 1 wherein the receptacle or transfer track 10 is shorter e.g. 18" long and a third spring 12 isn't necessary. In this particular apparatus, spring 14 is adjacent the inlet extremity, and spring 13 is adjacent the exit extremity. The direction of travel of the articles in FIG. 8 is the same as that shown in FIG. 6.

Variation in the spring angle at the various spring stations along the trackway is necessary in order to effectively cancel out extraneous track motion caused by track whip, extraneous track flexure caused by mounting of the drive means thereon, distance from the spring mounting or station, etc. The portion of the track including the inlet is quite critical, and hence adjustment of the spring station adjacent the inlet has a marked influence upon the nature of the movement along the track. In general, the angle of the spring or springs comprising the first spring station should be within the range of from about +10° to +20°. In like manner, the spring station next encountered by the articles moving along the trackway is also quite critical and is disposed in a range of angles which is different from the range of angles of the inlet spring. Thus, the range of angles for the second spring or spring station has been found to be preferably between 0° and +12°. Where the transfer feeder FIG. 6 is somewhat longer, e.g., 36" as opposed to 18" such as the feeder shown in FIG. 8, a third spring station may be employed. When such third station is employed, the factors influencing the behavior of the track adjacent such third spring station are different from the factors effecting the previous station which in turn are different from the factors influencing the track behavior at the initial spring station. It has been found that when a third station is employed, the angle of disposition with respect to the vertical varies between −5° and +5°. Such variation appears to be general for the terminal station in even longer trackways where 4 or more spring stations are employed. For most purposes, two or three spring stations have been found sufficient for transfer feeding purposes. In any event the angle of the spring or springs constituting station A (inlet) is different from the angle of the spring or springs constituting station B, and, in turn, is different from the angle of the spring or springs constituting station C. The controlling differential is between stations A and B, and this is generally in the range of from 2° to 15°. Although the ranges of angular disposition may overlap in successive stations, due to track differences, the angles of the respective springs will always be different.

The coefficient of sliding friction varies with the relative shapes of the article and track, and the relative material and surface finish of the article and track. These desiderata will determine the optimum relative angles at which the conveyor track hits the part and it should at all times be constant. That is, at each point along the track the angle of approach to impact of the track upon the article as viewed from the article should be constant. In varying the angle of the springs, the objective is to secure an optimum relative angle, and to provide this same optimum relative angle along the track course. Attainment of the optimum angle results in maximum speed and maximum stability (minimum bounce) for any given part and track, especially important where the track is disposed on an incline for conveying from one horizontal level to another.

The different amplitudes referred to in FIGS. 4 and 6 are conveniently secured with a pneumatic vibration inducing device by regulating the pressure drop through the vibration inducing device 27. This is conveniently effected by providing the inlet line for the pressurized gas with a pressure regulating valve. The exhaust ports 59 and 60 of the vibration device shown in FIG. 3 are conveniently manifolded and connected to a single exhaust line which is also fitted with a pressure regulating device through which the exhaust gases must pass before being exhausted to the atmosphere. Thus, inlet pressure which controls the frequency of vibration may be regulated from the pressure control valve on the inlet line, and the pressure drop which controls amplitude of vibration may be regulated substantially independently with the pressure control valve in the exhaust line.

There has thus been provided a vibratory apparatus which is so adapted and constructed as to permit individual adjustment of the supporting leaf springs to angles which have been determined to be best suited for the particular conditions. A convenient means of determining the proper spring angle is as follows:

Determination of the proper spring angle may conveniently be based on measured local velocity of a given part along a given track. For example, all the springs (e.g. 12, 13 and 14) may be set at the same angle $\theta$, e.g. 20° from the normal to the rear or part inlet point. Variation in part speed is observed over one segment of the track directly over one of the springs, usually the first from the inlet end. As the angle is decreased toward the normal, the velocity increases to a maximum, and then with further decrease in the angle $\theta$, the velocity will decrease. The angle at the maximum speed point indicates the approximate optimum angle for the spring supporting the track segment examined. The spring at this point is secured at this angle, and velocity measured with the identical part across the segments of track corresponding to the other springs.

In general, a decrease in velocity accompanied by a decrease in stability, i.e. an increase in bounce, indicates the need for a reduction of the spring angle, i.e. less positive or more negative, in that segment of track. A decrease in speed without an increase in bounce indicates a need for increasing the spring angle in that segment in a less negative or more positive direction, such direction being shown in FIG. 6. As a rule of thumb, a uniform gradient of change in angle between adjacent springs will be found. Thus, if the difference in angle between 12 and 13, for example (FIG. 1), is 5°, substantially the same will be found between springs 13 and 14 (FIG. 1) in the same direction. This would hold more nearly true if the base 11 moved as a rigid body. If it undergoes flexure, the rule of thumb becomes less accurate.

Once the optimum angle is determined by the above method, a further refinement may be achieved by again studying the variation in speed over a given segment with spring angle while maintaining the relative angular displacements determined in the first series of adjustments. Further replications may be made if desired to secure constant speed from one end of the track to the other. The length of track and number of springs is immaterial.

The principles of this invention are applicable to other forms of conveying apparatus. The base need not be disposed below the conveying receptacle but may, alternatively be disposed in a position above the receptacle 10. Nevertheless, the principles hereof apply as well. These principles likewise apply to screens, vibratory degreasing and conveying apparatus, vibratory tubular and trough conveyors for conveying granular or particulate materials, parts feeders, and the like. So long as means are provided for adjusting the angle of the springs as between the base and the conveyor receptacle, the advantages of the present invention may be realized. As indicated above, whether the angle is adjusted by angle adjusting means carried by the receptacle member coacting with pivot means in the base, or by angle adjusting means carried by the base member coacting with pivot means in the receptacle member makes no difference in the results which may be secured with the apparatus of the present invention. Although it is preferred to drive the conveyors of the present invention with a single non-impacting pneumatic where the reciprocating member impacts against the cylinder end of the body being driven. The springs are preferably made of spring steel, although any other resilient material may be used, for example, fiber glass reinforced resinous springs.

Other modes of applying the principle of this invention may be employed instead of those specifically set forth above, changes being made as regards the details herein disclosed provided the elements set forth in any of the following claims, or the equivalent of such be employed.

I claim:

1. In a vibratory conveyor comprising a base, an elongated conveyor receptacle disposed parallel to said base and having an inlet extremity and an exit extremity, a plurality of spring stations disposed at spaced intervals from each other, each of which stations includes an elongated flat leaf spring secured at its extremities to the base and the receptacle, respectively, for resiliently supporting and guiding said receptacle along a confined curved path which lies in a single plane, and means for oscillating said receptacle along said path, the improvement which comprises: the first of said spring stations including spring means disposed adjacent the inlet extremity and having a spring angle with respect to the vertical which differs from the angle of disposition of the spring means in the next succeeding spring station by an amount which is in the range of from 2° to 15°.

2. In a vibratory conveyor comprising a base, an elongated conveyor receptacle disposed parallel to said base and having an inlet extremity and an exit extremity, a plurality of spring stations disposed at spaced intervals from each other, each of which stations includes an elongated flat leaf spring secured at its extremities to the base and the receptacle, respectively for resiliently supporting and guiding said receptacle along a confined curved path which lies in a single plane, and means for oscillating said receptacle along said path, the improvement which comprises: the first of said spring stations including spring means disposed adjacent the inlet extremity and having a spring angle with respect to the vertical between +10° and +20°; the next succeeding spring station including spring means disposed at an angle with respect to the vertical between 0° and +12°, the difference between the spring angles in said first and second spring stations being in the range of from 2° to 15°.

3. In a vibratory conveyor comprising a base, an elongated conveyor receptacle disposed parallel to said base and having an inlet extremity and an exit extremity, at least two spring stations, each of which stations includes an elongated flat leaf spring secured at its extremities to the base and the receptacle, respectively, for resiliently supporting and guiding said receptacle along a confined curved path which lies in a single plane, and means for oscillating said receptacle along said path, each of the spring stations being disposed in spaced relation to each other, the first of said spring stations being disposed adjacent the inlet extremity of said receptacle, and the second being disposed adjacent the exit extremity, the improvement which comprises: in the spring station adjacent the inlet, a spring angle with respect to the vertical of from +12° to +20°; and in the spring station adjacent the exit, a spring angle with respect to the vertical of from 0° to +10° (see claim 1).

4. The vibratory conveyor of claim 3 including means for adjusting the angle of the springs with respect to the vertical in each said spring station.

5. In a vibratory conveyor comprising a base, an elongated conveyor receptacle disposed parallel to said base and having an inlet extremity and an exit extremity, at least three spring stations each of which stations includes an elongated flat leaf spring secured at its extremities to the base and the receptacle, respectively, for resiliently supporting and guiding said receptacle along a confined curved path which lies in a single plane, and means for oscillating said receptacle along said path, each of the spring stations being disposed at spaced uniform intervals from each other, the first of said spring stations being disposed adjacent to inlet extremity of said receptacle, the third being disposed adjacent the exit extremity, and the second being disposed intermediate the first and third stations, the improvement which comprises: in the spring station adjacent the inlet, a spring angle with respect to the vertical between +10° and +20°; in the intermediate spring station, a spring angle with respect to the vertical between +5° and +10°; and in the spring station adjacent the exit, a spring angle with respect to the vertical between 0° and −5°.

6. The vibratory conveyor of claim 5 including means for adjusting the angle of the springs with respect to the vertical in each said spring station.

References Cited by the Examiner
UNITED STATES PATENTS 2,563,081  8/51  Tauner _____ 209—329

SAMUEL F. COLEMAN, *Primary Examiner.*

WILLIAM B. LA BORDE, *Examiner.*